United States Patent
Chiang et al.

(10) Patent No.: US 8,953,103 B2
(45) Date of Patent: *Feb. 10, 2015

(54) PROJECTOR EMBEDDED INTO A PORTABLE COMMUNICATION DEVICE

(75) Inventors: Kuo-Ching Chiang, Linkou Township (TW); Chi Wen Liu, Hsin Chu (TW); Ching Yu Chang, Yi Lan Xian (TW)

(73) Assignee: Bascule Development AG LLC, Wilmington, DE (US)

( * ) Notice: Subject to any disclaimer, the term of this patent is extended or adjusted under 35 U.S.C. 154(b) by 1042 days.

This patent is subject to a terminal disclaimer.

(21) Appl. No.: 11/701,158

(22) Filed: Jan. 31, 2007

(65) Prior Publication Data

US 2007/0132963 A1 Jun. 14, 2007

Related U.S. Application Data

(63) Continuation of application No. 10/989,622, filed on Nov. 15, 2004, now Pat. No. 7,178,735.

(51) Int. Cl.
  *G02F 1/1335* (2006.01)
  *H04N 9/31* (2006.01)
  *H04M 1/02* (2006.01)
  (Continued)

(52) U.S. Cl.
  CPC .......... *H04N 9/3197* (2013.01); *H04N 9/3105* (2013.01); *H04N 9/3164* (2013.01); *H04N 9/3173* (2013.01); *H04M 1/0272* (2013.01); *H04M 1/72533* (2013.01); *H04N 2005/4425* (2013.01); *H04N 2005/745* (2013.01)
  USPC ....................................... 349/5; 349/7; 349/8

(58) Field of Classification Search
  USPC ...................................... 349/5–10
  See application file for complete search history.

(56) References Cited

U.S. PATENT DOCUMENTS

| 4,665,385 A | 5/1987 | Henderson |
| 4,737,448 A | 4/1988 | Hochberg |

(Continued)

FOREIGN PATENT DOCUMENTS

| CN | 101036395 A | 9/2007 |
| CN | 101561620 A | 10/2009 |

(Continued)

OTHER PUBLICATIONS

Cotting, D., et al., "Embedding Imperceptible Patterns Into Projected Images for Simultaneous Acquisition and Display," Proceedings of the Third IEEE and ACM International Symposium on Mixed and Augmented Reality (ISMAR '04), Washington, D.C., Nov. 2-5, 2004, 10 pages.

(Continued)

*Primary Examiner* — Charles Chang
(74) *Attorney, Agent, or Firm* — Christensen O'Connor Johnson Kindness PLLC

(57) ABSTRACT

The device comprises a projection display module is coupled to the control IC for the data projection. The projection display module includes three liquid crystal panels that perform image displays in red, green, and blue, respectively; light emitting sources are employed and positioned in correspondence with the liquid crystal panels, respectively. A prism is used for each display color combination, wherein the liquid crystal panels and the light emitting sources are positioned on the light-incidence side of the side surfaces of the prism. A projection lens is provided on the light emission side of the prism.

10 Claims, 3 Drawing Sheets

(51) Int. Cl.
  *H04M 1/725* (2006.01)
  *H04N 5/44* (2011.01)
  *H04N 5/74* (2006.01)

(56) References Cited

U.S. PATENT DOCUMENTS

| | | | |
|---|---|---|---|
| 4,809,810 A | 3/1989 | Elfman | |
| 5,050,965 A | 9/1991 | Conner | |
| 5,124,818 A | 6/1992 | Conner | |
| 5,150,138 A | 9/1992 | Nakanishi | |
| 5,500,692 A | 3/1996 | Onozuka | |
| 5,517,189 A | 5/1996 | Bachhuber et al. | |
| 5,537,258 A | 7/1996 | Yamazaki | |
| 5,818,634 A | 10/1998 | Richard | |
| 5,883,465 A | 3/1999 | Inoguchi | |
| 5,907,407 A | 5/1999 | Atkinson | |
| 6,023,371 A | 2/2000 | Onitsuka | |
| 6,052,166 A | 4/2000 | Chikazawa | |
| 6,073,034 A | 6/2000 | Jacobsen et al. | |
| 6,085,112 A | 7/2000 | Kleinschmidt et al. | |
| 6,292,305 B1 | 9/2001 | Sakuma et al. | |
| 6,552,754 B1* | 4/2003 | Song et al. | 348/750 |
| 6,556,181 B2 | 4/2003 | Yamada | |
| 6,594,616 B2 | 7/2003 | Zhang et al. | |
| 6,655,597 B1* | 12/2003 | Swartz et al. | 235/462.45 |
| 6,665,012 B1* | 12/2003 | Yang et al. | 348/308 |
| 6,710,909 B2 | 3/2004 | Naito | |
| 6,733,137 B2 | 5/2004 | Tomiya | |
| 6,805,448 B2 | 10/2004 | Yokoyama | |
| 6,988,808 B2 | 1/2006 | Cromer | |
| 7,050,035 B2 | 5/2006 | Iisaka | |
| 7,059,732 B2* | 6/2006 | Oross et al. | 353/119 |
| 7,070,281 B2* | 7/2006 | Kato | 353/20 |
| 7,170,671 B2 | 1/2007 | Wu | |
| 7,173,586 B2 | 2/2007 | Osame | |
| 7,178,735 B2 | 2/2007 | Chiang | |
| 7,213,924 B2* | 5/2007 | Okuyama et al. | 353/33 |
| 7,270,425 B2 | 9/2007 | Arai | |
| 7,303,291 B2 | 12/2007 | Ikeda | |
| 7,311,403 B2 | 12/2007 | Yoshii | |
| 7,434,945 B2 | 10/2008 | Maeda | |
| 7,500,758 B1 | 3/2009 | Adachi | |
| 7,724,247 B2 | 5/2010 | Yamazaki | |
| 7,751,650 B2 | 7/2010 | Tada | |
| 7,874,486 B2 | 1/2011 | Chiang | |
| 7,914,150 B2 | 3/2011 | Yamazaki | |
| 8,021,001 B2 | 9/2011 | Iwanaga | |
| 8,045,273 B2 | 10/2011 | Chen | |
| 8,127,995 B2 | 3/2012 | Chiang | |
| 2002/0036694 A1* | 3/2002 | Merril | 348/220 |
| 2003/0092470 A1 | 5/2003 | Kurakane | |
| 2004/0017518 A1 | 1/2004 | Stern | |
| 2004/0135975 A1 | 7/2004 | Wang | |
| 2004/0206825 A1* | 10/2004 | Schmidt et al. | 235/462.46 |
| 2004/0207822 A1* | 10/2004 | Lee et al. | 353/98 |
| 2004/0224081 A1 | 11/2004 | Sheu | |
| 2004/0268383 A1 | 12/2004 | Sezan | |
| 2005/0005102 A1* | 1/2005 | Meggitt et al. | 713/164 |
| 2005/0035701 A1 | 2/2005 | Choi | |
| 2005/0054337 A1 | 3/2005 | Nobusawa | |
| 2005/0083486 A1* | 4/2005 | Johnson | 353/15 |
| 2005/0127375 A1* | 6/2005 | Erchak et al. | 257/79 |
| 2005/0254127 A1 | 11/2005 | Evans | |
| 2005/0286123 A1 | 12/2005 | Abu-Ageel | |
| 2006/0007364 A1 | 1/2006 | Kuan | |
| 2006/0023172 A1 | 2/2006 | Ikeda | |
| 2006/0098451 A1 | 5/2006 | Hsu | |
| 2006/0102713 A1 | 5/2006 | Chiang | |
| 2006/0146007 A1 | 7/2006 | Lim | |
| 2006/0209374 A1* | 9/2006 | Willemsen | 359/205 |
| 2007/0001104 A1 | 1/2007 | Yokote | |
| 2007/0046866 A1 | 3/2007 | Lee | |
| 2007/0080845 A1 | 4/2007 | Amand | |
| 2007/0146655 A1 | 6/2007 | Li | |
| 2007/0195287 A1 | 8/2007 | Chiang | |
| 2008/0084544 A1 | 4/2008 | Hall | |
| 2008/0180641 A1 | 7/2008 | Chiang | |
| 2008/0297729 A1 | 12/2008 | Fujinawa | |
| 2009/0315921 A1 | 12/2009 | Sakaigawa | |
| 2010/0079734 A1 | 4/2010 | Rehn | |
| 2010/0091249 A1 | 4/2010 | Benedix | |
| 2010/0149437 A1 | 6/2010 | Chiang | |
| 2010/0159850 A1 | 6/2010 | Chiang | |
| 2010/0328935 A1 | 12/2010 | Pance | |
| 2011/0090466 A1 | 4/2011 | Chiang | |
| 2011/0242392 A1 | 10/2011 | Chiang | |
| 2011/0310357 A1 | 12/2011 | Chiang | |
| 2012/0081408 A1 | 4/2012 | Chiang | |
| 2012/0113396 A1 | 5/2012 | Chiang | |
| 2012/0133899 A1 | 5/2012 | Chiang | |
| 2012/0170003 A1 | 7/2012 | Chiang | |
| 2013/0127934 A1 | 5/2013 | Chiang | |

FOREIGN PATENT DOCUMENTS

| | | |
|---|---|---|
| EP | 1 416 702 A1 | 5/2004 |
| TW | 200742929 A | 3/2002 |
| TW | M334948 U | 6/2008 |
| WO | 2005/006720 A1 | 1/2005 |

OTHER PUBLICATIONS

Van Kessel, P.F., et al., "A MEMS-Based Projection Display," Proceedings of the IEEE, 86(8)1687-1704, Aug. 1998.

Office Action mailed Jun. 3, 2005, in U.S. Appl. No. 10/989,622, filed Nov. 15, 2004, 9 pages.

Office Action mailed Nov. 16, 2005, in U.S. Appl. No. 10/989,622, filed Nov. 15, 2004, 10 pages.

Final Office Action mailed May 17, 2006, in U.S. Appl. No. 10/989,622, filed Nov. 15, 2004, 10 pages.

Notice of Allowance mailed Oct. 6, 2006, in U.S. Appl. No. 10/989,622, filed Nov. 15, 2004, 8 pages.

Office Action mailed May 6, 2010, in U.S. Appl. No. 11/783,551, filed Apr. 10, 2007, 9 pages.

Notice of Allowance mailed Oct. 28, 2010, in U.S. Appl. No. 11/783,551, filed Apr. 10, 2007, 7 pages.

Office Action mailed Jan. 12, 2010, in U.S. Appl. No. 11/734,175, filed Apr. 11, 2007, 11 pages.

Office Action mailed May 17, 2011, in U.S. Appl. No. 12/711,366, filed Feb. 24, 2010, 5 pages.

Office Action mailed Nov. 10, 2010, in U.S. Appl. No. 12/718,150, filed Mar. 5, 2010, 5 pages.

Final Office Action mailed Apr. 5, 2011, in U.S. Appl. No. 12/718,150, filed Mar. 5, 2010, 7 pages.

Office Action mailed Sep. 7, 2011, in U.S. Appl. No. 12/954,687, filed Nov. 26, 2010, 8 pages.

Notice of Allowance mailed Nov. 18, 2011, in U.S. Appl. No. 12/954,687, filed Nov. 26, 2010, 8 pages.

Notice of Allowance dated Jun. 3, 2013, in U.S. Appl. No. 13/237,934, filed Sep. 21, 2011, 13 pages.

Notice of Allowance dated Apr. 15, 2013, in U.S. Appl. No. 13/355,482, filed Jan. 20, 2012, 12 pages.

Office Action dated Jul. 18, 2013, in U.S. Appl. No. 12/987,118, filed Jan. 9, 2011, 30 pages.

Chinese Office Action dated Mar. 6, 2013, in Chinese Patent Application No. 201010133379.5, filed Mar. 10, 2010, 10 pages.

Office Action dated Dec. 2, 2013, in U.S. Appl. No. 13/214,496, filed Aug. 22, 2011, 40 pages.

Office Action dated Nov. 15, 2013, in U.S. Appl. No. 13/152,621, filed Jun. 3, 2011, 39 pages.

Taiwanese Office Action dated Sep. 6, 2013, in Taiwanese Patent Application No. 099141526, filed Nov. 30, 2010, 10 pages.

Office Action dated Dec. 27, 2013, in U.S. Appl. No. 13/342,509, filed Jan. 3, 2012, 42 pages.

Office Action dated Jan. 30, 2014, in U.S. Appl. No. 12/987,118, filed Jan. 9, 2011, 35 pages.

Taiwanese Office Action dated Nov. 18, 2013, in Taiwanese Patent Application No. 099106049, filed Mar. 2, 2010, 6 pages.

Taiwanese Office Action dated Mar. 5, 2014, in Taiwanese Patent Application No. 100123171, filed Jun. 30, 2011, 9 pages.

(56) References Cited

OTHER PUBLICATIONS

Final Office Action date May 8, 2014, in U.S. Appl. No. 13/342,509, filed Jan. 3, 2012, 22 pages.

Final Office Action Jun. 5, 2014, in U.S. Appl. No. 13/152,621, filed Jun. 3, 2011, 17 pages.

* cited by examiner

PROJECTOR EMBEDDED INTO A PORTABLE COMMUNICATION DEVICE

The application is a continuation application of U.S. patent application Ser. No. 10/989,622, filed on 15 Nov. 2004, now U.S. Pat. No. 7,178,735, entitled "Multi-function Portable Communication Device," which is hereby incorporated by reference in its entirety.

FIELD

The present disclosure relates generally to a portable terminal and more particularly to a multi-function portable terminal or device.

BACKGROUND

Cellular communications systems typically include multiple base stations for communicating with mobile stations in various geographical transmission areas. Each base station provides an interface between the mobile station and a telecommunications network. Mobile telephone systems are in use, or being developed, in which the geographic coverage area of the system is divided into smaller separate cells, which communicate with the network via a fixed station located in the cell. Mobile telephones belonging to the system are free to travel from one cell to another. When a subscriber within the same system or within an external system wishes to call a mobile subscriber within this system, the network must have information on the actual location of the mobile telephone.

Recently, the price of cellular telephones has been greatly reduced and become affordable to lots of people. It is common that a person owns more than one cellular phone. Some people even replace their cellular telephones as often as they replace their clothes or hairstyle. The cellular manufacturers have to release new models with different appearances, functions, and styles more frequently so as to attract the attention of the buyer and occupy a favorable market share. Furthermore, the conventional projector employs a white light lamp as a light source, therefore, at least two reflector lenses and at least three light-split lenses are required to split the white light into three colors (red, green, and blue). Some prior optical systems are expensive, complicated, and large in size. Further, the lamp light source will often generate a lot of heat.

SUMMARY

The present disclosure describes a projector with a panel form light source.

The present disclosure describes a portable device that comprises a control IC embedded in a projector and a projection display module for data projection. The projection display module includes three liquid crystal panels that perform image displays in red, green, and blue, respectively; and light emitting sources employed and positioned in correspondence with the liquid crystal panels, respectively. A dichroic prism is used for each display color combination, wherein the liquid crystal panels and the said light emitting sources are positioned on the light-incidence side of the dichroic prism. A projection lens is provided on the light emission side of said dichroic prism to enlarge the projection image. In described embodiments, light emitting sources are organic EL (electroluminescence) elements that are capable of emitting red, green, and blue light.

In described embodiments, a portable device comprises a central control IC embedded in a portable device; an RF module coupled to the control IC for wireless communication; and a display, memory, and an input unit coupled to the control IC. In described embodiments, a pinhole camera detector is embedded in said portable device. In described embodiments, a pinhole camera detector is sensitive to a transmittance frequency from about 300 MHz to 2.5 GHz.

A further aspect of the present disclosure is a portable device comprising a control IC embedded in the portable device; an RF module coupled to the control IC for wireless communication; a display, memory, and an input unit coupled to the control IC; and a remote control module coupled to said central control IC to control or lock a device by the key code coded in the memory.

Another embodiment of the present disclosure comprises a control IC embedded in a portable device; an RF module coupled to the control IC for wireless communication; a display, memory, and an input unit coupled to the control IC; and an alcohol ingredients detecting module coupled to the control IC to detect alcohol containment.

In described embodiments, a portable device comprises a control IC embedded in the portable device; an RF module coupled to the control IC for wireless communication; a display, memory and an input unit coupled to the control IC; and an illumination source embedded in the portable device for acting as a pointer or flashlight. In described embodiments, the illumination source includes a laser component. In described embodiments, the illumination source includes a lamp (or LED) and a reflector positioned in accordance with the lamp to reflect light generated by the lamp.

DETAILED DESCRIPTION

The present disclosure relates generally to a multi-function portable terminal. The portable terminal includes, but is not limited to, cellular phone, PDA (personal digital assistant), smart phone, and equivalents thereof.

Figure 1:
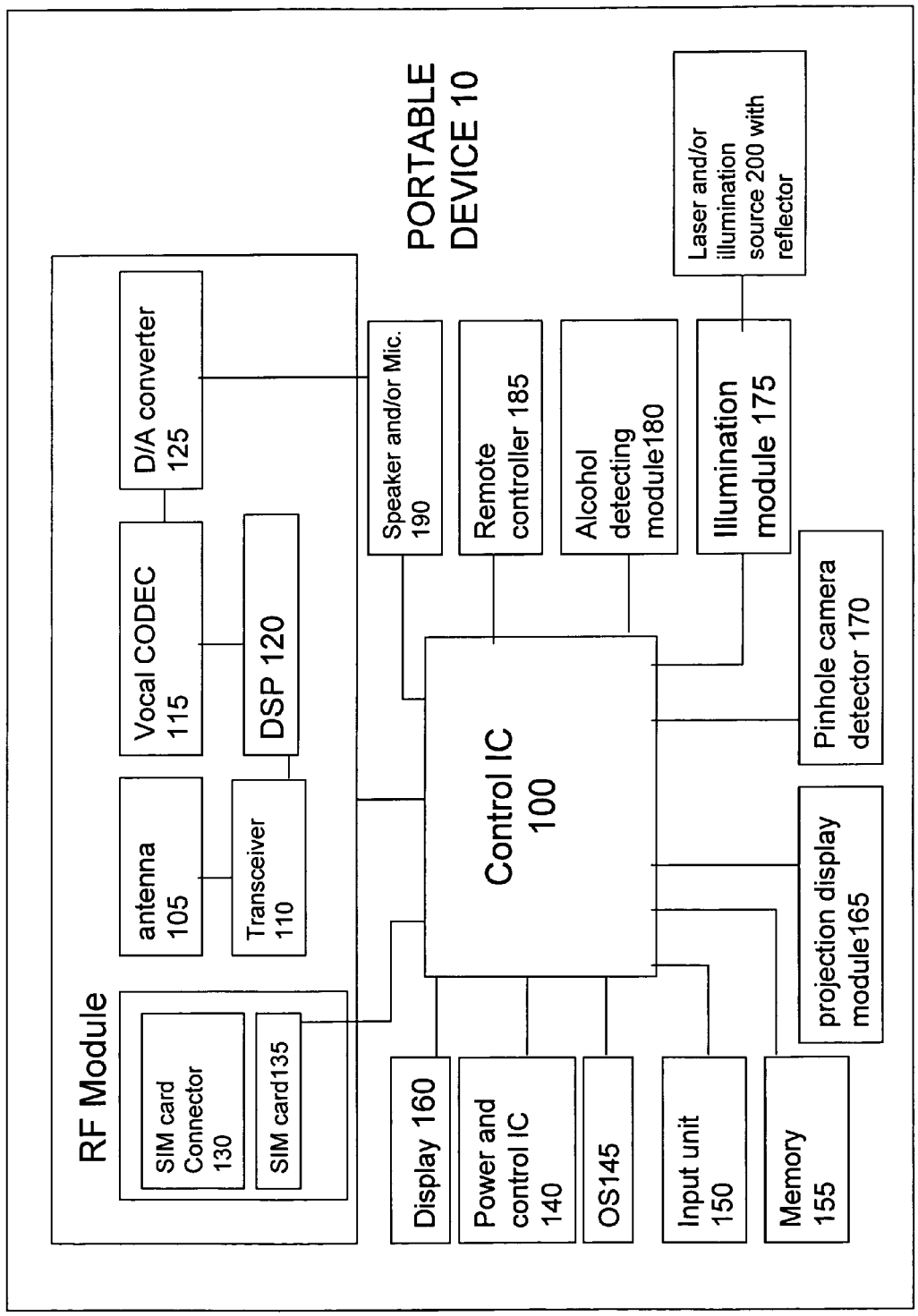
FIG. 1 shows a diagram of a cellular terminal according to the present disclosure.

FIG. 1 shows a block diagram of a portable terminal with SIM card connector 130 to carry the SIM card 135. The SIM card is not necessary for some types of cellular systems such as a PHS system. The diagram is used for illustration, and not used for limiting the scope of the present disclosure. The portable terminal or device 10 includes an RF module. The RF module includes antenna 105. This antenna 105 is connected to a transceiver 110, which is used to receive and transmit signals. The RF module further includes CODEC 115, DSP 120, D/A converter 125, and an A/D converter as well. The present disclosure describes a central control IC 100, an input unit 150, a built-in display 160, OS 145, power and control IC 140, and memory 155 including a ROM program memory, a RAM memory, and a nonvolatile FLASH memory. The RF module may perform the function of signal transmitting and receiving, frequency synthesizing, baseband processing, and digital signal processing. The SIM card hardware interface is used for receiving a SIM card. In described embodiments, signals are sent to actuators, such as a loudspeaker and a microphone 190.

Functions and modules described herein can be implemented alone or in combination with each other or with other functions and modules, as may be desirable for a given implementation.

In described embodiments, pinhole camera detector 170 indicates the addition of a device, which is suitable for wireless or wired signals. The pinhole camera detector is sensitive to the transmittance frequency, for example, from 300 MHz to 2.5 GHz, and is coupled to the control IC 100. The detector also includes a switch coupled to a pinhole camera detector to activate the detector. The pinhole video camera includes a printed circuit board, a charged coupled device (hereinafter referred to as "CCD"), memory means for storing a single frame image which is generated by an image signal from the CCD and a signal converting means, a connector with wires to connect the aforementioned circuits to a power source and the displayer. A conical convex lens is accommodated to have an apical angle and the apex is fixed so as to face the pinhole. The pinhole camera detector 170 is available to scan and detect the operation frequency while the pinhole camera is functioning. A so-called spy camera could also be detected by the pinhole camera detector 170 as well. The scanned result can be sent to the display 160 and/or the loudspeaker and a microphone 190, thereby sending an alarm signal.

Figure 2:
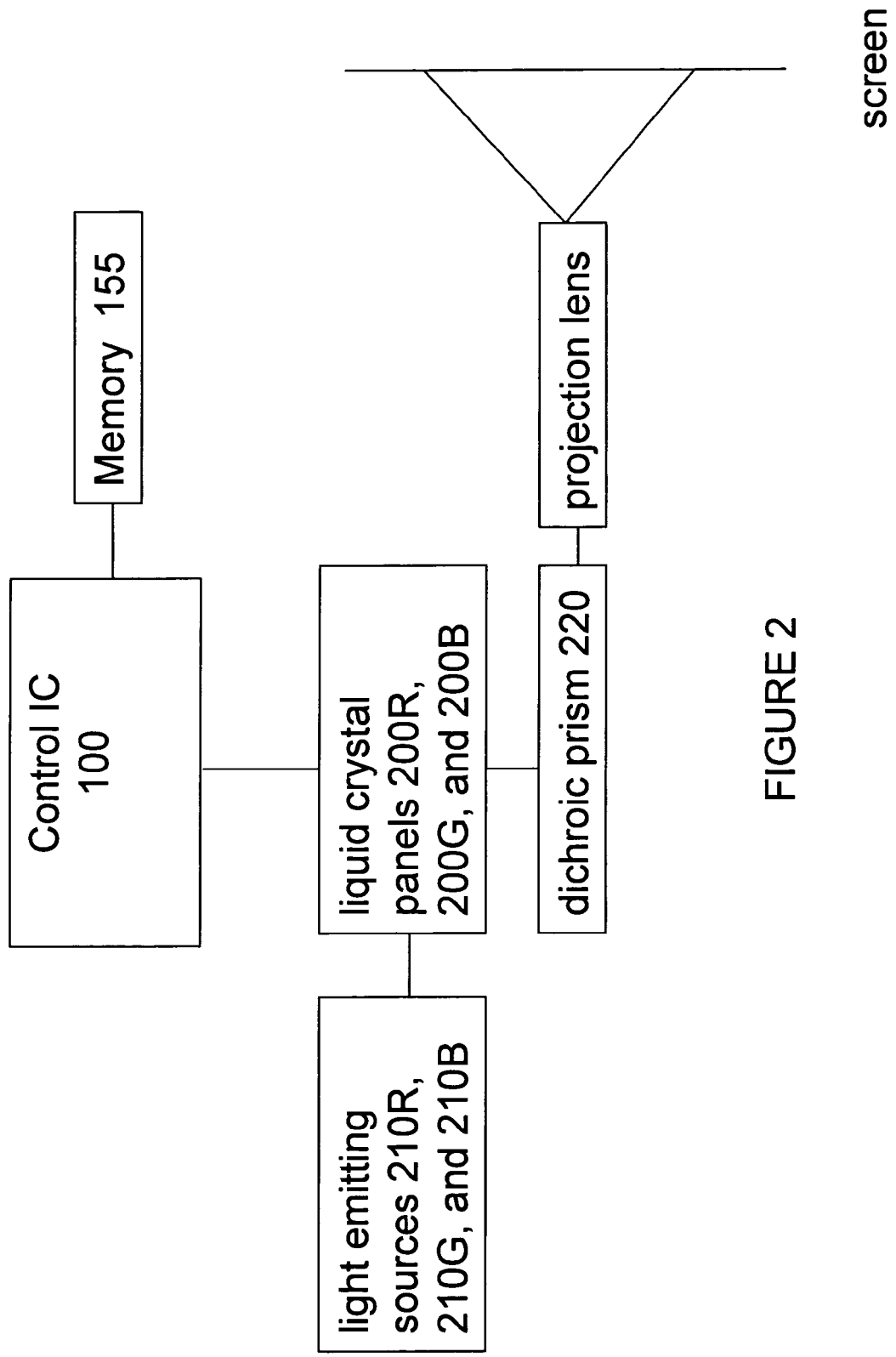
FIG. 2 shows a diagram of a projection display module according to the present disclosure.

Moreover, the portable terminal shown in FIG. 1 has another function module described with reference to FIG. 2. A projection display module 165 is coupled to the control IC 100. One type of such a projection display module 165 is the liquid crystal projector wherewith images on a liquid crystal panel are enlarged and projected by a projection lens onto a reflective screen and thus displayed. The liquid crystal projection display module comprises a light source lamp unit inside a shell of the device. Electrical discharge lamps such as metal halide lamps or halogen lamps could be used in the light source lamp unit. The light emitted from this light source lamp unit is guided via a mirror to dichroic minors, whereby it is separated into red light, green light, and blue light. The images displayed on the three liquid crystal panels, respectively, are illuminated by their respective colors, and this light is combined by a dichroic prism.

Figure 3:
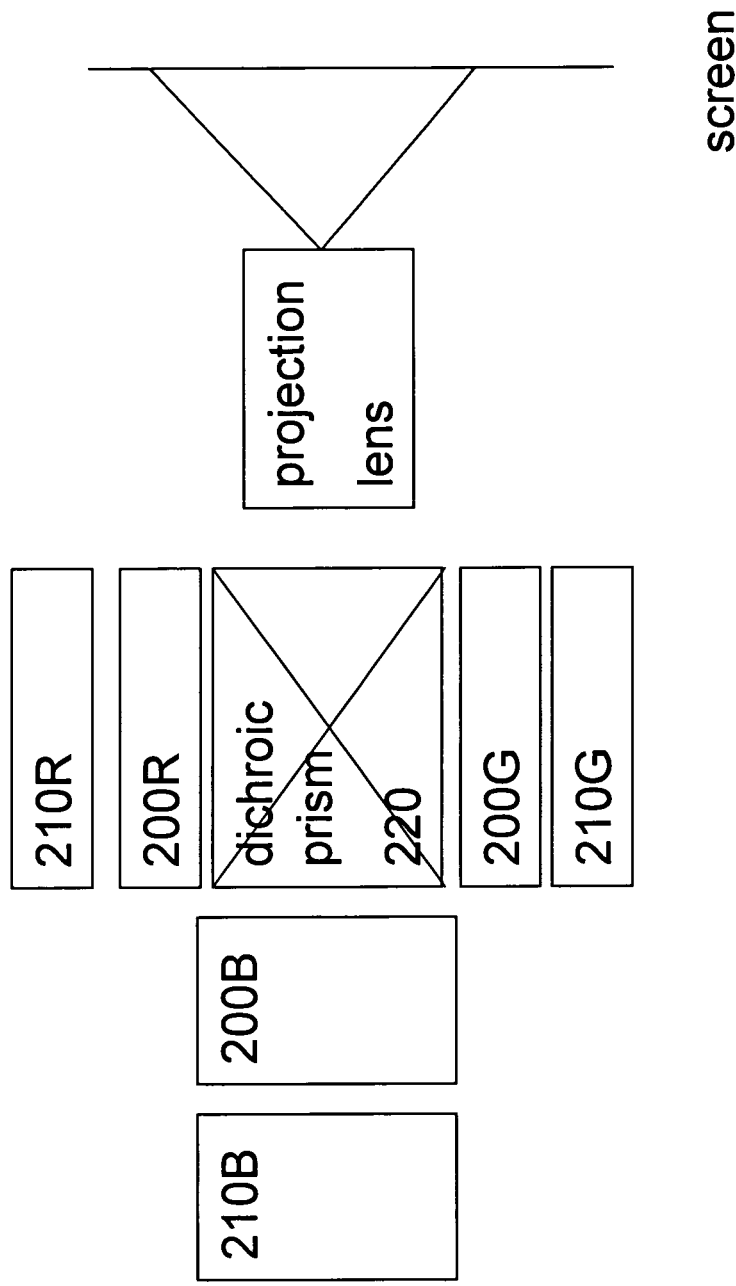
FIG. 3 shows a diagram of a projection display module with EL as the illumination source according to the present disclosure.

In an embodiment described with reference to FIG. 3, the liquid crystal projector comprises three liquid crystal panels 200R, 200G, and 200B that perform image displays in red, green, and blue, respectively. Preferably, panel-form light emitting sources 210R, 210G, and 210B are employed and positioned in correspondence with the liquid crystal panels, respectively. In one embodiment, the light emitting sources 210R, 210G, and 210B are organic EL (electroluminescence) elements. These organic EL elements are electric-field light emitting thin films that are capable of emission of red, green, and blue light. The EL elements are formed behind and adjacent to the liquid crystal panels 200R, 200G, and 200B, respectively. The liquid crystal panels 200R, 200G, and 200B and the light sources 210R, 210G, and 210B are positioned on the light-incidence side of the side surfaces of the dichroic prism 220 for each display color combination. The projection lens could be made up of a plurality of lenses. Thus, the data or file stored in the memory of the device can be projected on a screen or wall. It allows the user to project the image, game, or file on an external screen. The EL element is small, flat form, and light weight Therefore, it allows the projector to be integrated in the portable device.

Another aspect of the present invention is that the device 10 also includes remote control module 185. The remote control module 185 may be used to control or lock the device by the key code coded in the remote control module 185. The remote controller is also a mature technology. Remote controllers for electrical and electronic appliances are well known, and are widely used. In one example, the remote control module 185 applies infrared rays for transmission, and each company provides its appliances and remote controllers with its specific protocol of communication. An example of the remote control module 185 is provided with an interface for downloading the relevant information into the remote control module 185 from an external source. In one embodiment, a remote controller is provided with an infrared transmitter for sending remote controlling signals to the appliance. The remote controller is provided with a RAM, ROM, EPROM, or EEPROM (memory 155) to which set-up information regarding the key-map and signal format of at least one apparatus to be controlled is entered (e.g., into an internal database). Such information can be commonly provided to the internal database from various sources, such as from a smart card, from an Internet database, from a plugged-in card, etc. The database in the appliance contains set-up data that can be transmitted by the transmitter to the remote control module 185, providing it all the information it needs in order to control the appliance. In described embodiments, the device uses the RF module to download the key code from a database through a network.

Another aspect of the present disclosure is that an embodiment of the portable device 10 also includes an alcohol detecting module 180. The alcohol detecting module 180 is provided and coupled to the control IC 100 to detect the alcohol ingredients from one's breath, for example, the module is capable of detecting alcohol content in a breath sample. The alcohol detecting module 180 is sensitive to the aforementioned alcohol content. If the bonding is detected, the signal will be sent from the alcohol detecting module 180 to the control IC 100 to determine the level of the alcohol ingredients. Then, the result will be sent to the display 160.

Further, an illumination module 175 is also described in the present disclosure. The portable device could be used as a laser pointer if the illumination module 175 includes a laser component 200. A switch can be provided to activate the laser. In another embodiment, the illumination module 175 includes a light source to allow the portable device to be used as a flashlight. For example, one may turn on the illumination module 175 in a dark environment, such as in a theater. The illumination module 175 could be coupled to the control IC 100 or implemented with an independent control IC. In some embodiments, the illumination source includes a laser component. In some embodiments, the illumination source includes a lamp (or LED) and a reflector positioned in accordance with the lamp to reflect light generated by the lamp. The aforementioned laser devices or LEDs could be used for the projector as the aforementioned panel-form light sources as well.

As will be understood by persons skilled in the art, the foregoing description is illustrative of the present invention rather than limiting the present invention. In view of the present disclosure, modification will now suggest itself to those skilled in the art. Thus, the invention is not to be limited to the specific embodiments described herein, but rather the invention is intended to cover various modifications and similar arrangements included within the spirit and scope of the appended claims, the scope of which should be accorded the broadest interpretation so as to encompass all such modifications and similar structures. It will be appreciated that various changes can be made without departing from the spirit and scope of the invention.

What is claimed is:

1. A portable two-way communication device comprising:
    a control IC embedded in the portable two-way communication device;
    an RF module coupled to the control IC and configured for two-way wireless communication with one or more other two-way communication devices;

a prism embedded in the portable two-way communication device;

three color image display panels embedded in the portable two-way communication device and coupled to the control IC, wherein the three color image display panels are configured to display images in red, green, and blue, respectively;

light emitting sources embedded in the portable two-way communication device, wherein the light emitting sources include three color laser devices positioned in correspondence with the three color image display panels to emit red, green, and blue light, wherein the three color image display panels and the light emitting sources are positioned on a light-incidence side of the prism; and a projection lens embedded in the portable two-way communication device and positioned on a light emission side of the prism to enlarge a projection image.

2. The portable two-way communication device of claim 1, further comprising a remote data transferring module with communication protocol for wirelessly downloading information from an external source to the portable two-way communication device.

3. The portable two-way communication device of claim 1, further comprising an illumination module embedded in the portable two-way communication device, wherein the illumination module is separate from the three color light emitting devices positioned in correspondence with the three color image display panels, and wherein the illumination module is configured to function as a flashlight or a laser pointer.

4. A portable two-way communication device comprising:
a control IC embedded in the portable two-way communication device;

an RF module coupled to the control IC and configured for two-way wireless communication with one or more other two-way communication devices;

a prism embedded in said portable two-way communication device;

three color image display panels embedded in said portable two-way communication device and coupled to the control IC, wherein the three color image display panels are configured to display images in red, green, and blue, respectively;

light emitting sources embedded in the portable two-way communication device, wherein the light emitting sources include three color light emitting devices positioned in correspondence with the three color image display panels to emit red, green, and blue light, wherein the three color image display panels and the light emitting sources are positioned on a light-incidence side of the prism; and a projection lens embedded in the portable two-way communication device and positioned on a light emission side of the prism to enlarge a projection image.

5. The portable two-way communication device of claim 4, further comprising a remote data transferring module with communication protocol for wirelessly downloading information from an external source to the portable two-way communication device.

6. A portable two-way communication device comprising:
a control IC embedded in the portable two-way communication device;

an RF module coupled to the control IC and configured for two-way wireless communication with one or more other two-way communication devices;

a prism embedded in the portable two-way communication device;

three color image display panels embedded in the portable two-way communication device and configured to display images in red, green, and blue, respectively;

light sources embedded in the portable two-way communication device, wherein the light sources are guided to the prism, and wherein the images displayed on the three color image display panels, respectively, are illuminated by their respective colors, and combined by the prism;

a projection lens embedded in the portable two-way communication device and positioned on a light emission side of the prism to enlarge a projection image; and a remote data transferring module with communication protocol for wirelessly downloading information from an external source for projection via the three color image display panels.

7. A method comprising:
emitting red, green, and blue light from light sources positioned within a shell of a portable two-way communication device, wherein:
the portable two-way communication device is configured to operate in a two-way wireless communication mode,
the light sources are positioned in correspondence with three color image display panels within the shell of the portable two-way communication device, and
the three color image display panels and the light sources are positioned on a light-incidence side of a prism within the shell of the portable two-way communication device;

combining, in the prism, light received from the three color image display panels to form a projection image; and projecting the projection image using a projection lens positioned within the shell of the portable two-way communication device, wherein the projection lens is positioned on a light-emission side of the prism.

8. The method of claim 7, wherein the light sources comprise one or more light-emitting diodes.

9. The method of claim 7, further comprising receiving a key code at the portable two-way communication device prior to projecting the projection image.

10. The method of claim 9, wherein the key code is operable to permit control of the portable two-way communication device to project the projection image.

* * * * *